United States Patent Office 3,629,179
Patented Dec. 21, 1971

3,629,179
VINYL ESTER POLYMER EMULSIONS FREE OF CARBOXYL GROUPS STABILIZED WITH A ZINC COMPOUND
John E. Bristol, Niagara Falls, N.Y., assignor to E. I. du Pont de Nemours and Company, Wilmington, Del.
No Drawing. Continuation-in-part of application Ser. No. 552,696, May 25, 1966. This application May 22, 1969, Ser. No. 827,041
Int. Cl. C08f 45/54
U.S. Cl. 260—29.6        9 Claims

ABSTRACT OF THE DISCLOSURE

Aqueous emulsions of vinyl ester polymers which are free of carboxyl (COOH) groups, including the homopolymers of vinyl esters of 2 to 8 carbon monobasic alkanoic acids, and various copolymers thereof, which emulsions have a pH of 5 to 7 and contain from 0.05 to 1% by weight of zinc oxide, zinc hydroxide, zinc carbonate or a zinc salt of a 2 to 18 carbon aliphatic carboxylic acid having an ionization constant in water not higher than that of acetic acid. The zinc compound buffers the emulsion and stabilizes it against any substantial increase in viscosity during storage. The preferred emulsions are emulsions of polyvinyl acetate having a pH of 6 to 7 and containing 0.2 to 0.6% by weight zinc oxide.

CROSS-REFERENCE TO RELATED APPLICATIONS

This application is a continuation-in-part of my copending application Ser. No. 552,696, filed May 25, 1966 and now abandoned.

FIELD OF THE INVENTION

This invention relates to emulsions of vinyl ester polymer resins and particularly to emulsions of such resins which have improved viscosity stability during storage.

BACKGROUND OF THE INVENTION

Emulsions of vinyl ester polymer resins, including vinyl ester copolymer resins, are conventionally prepared by polymerizing a vinyl ester monomer, or a mixture of such monomer with a copolymerizable monomer, as an emulsion in a water solution of an emulsifying agent and a polymerization initiator. Many emulsifying agents such as gelatin, polyvinyl alcohol, organic sulfates and sulfonates and salts of sulfonated oils and the like, have been proposed, as have also many initiators including organic peroxygen compounds such as benzoyl and lauryl peroxides and inorganic peroxygen compounds such as the persulfates, perborates and the like. The polymer emulsions obtained are useful for many purposes, e.g., as adhesives or in the formulation of adhesives. However, such emulsions, which usually contain 35 to 70% by weight of the vinyl ester polymer, tend to increase substantially in viscosity in a relatively short time. This is an undesirable characteristic and there exists a distinct need for emulsions of this kind that can be stored for substantial periods, e.g., at least 3 months, under normal ambient temperature conditions, e.g., 2–40° C., without significant change in viscosity occurring.

Increases in viscosity during storage of such emulsions are generally accompanied by increases in the acidity of the emulsions resulting, apparently, from the slow hydrolysis of the polyvinyl ester. Such increases in acidity are undesirable even though not accompanied by any significant increase in viscosity.

Uelzmann U.S. Patent 2,904,526 discloses the use of aqueous solutions of alkaline zinc-ammonia-polymer complexes, whose polymer component contains carboxyl (COOH) groups, as agents for suspending pigments, including zinc oxide, in water-base paints. The patent discloses that the complex can serve as the sole pigment binder and film former, or that it can be used in conjunction with various other binder resins, including polyvinyl acetate. However, no stable non-alkaline vinyl ester polymer emulsion containing zinc oxide or any zinc compound is disclosed; in fact, it is stated that zinc oxide exerts a powerful precipitating or de-stabilizing action on the binder latices present in water-base paints.

SUMMARY OF THE INVENTION

The stabilized aqueous emulsions of the invention are: Aqueous emulsions having a pH of 5 to 7 and consisting essentially of (A) a vinyl ester polymer which is free of carboxyl groups and is (a) a homopolymer of a vinyl ester of a 2 to 8 carbon monobasic alkanoic acid, (b) a copolymer of two or more such vinyl esters or (c) a copolymer of one or more such vinyl esters with one or more 2 to 20 carbon alphaolefins and/or one or more esters of acrylic acid, methacrylic acid, maleic acid, fumaric acid or itaconic acid and a 1 to 8 carbon alkanol; and (B) 0.05 to 1%, based upon the emulsion weight, of a zinc compound which is zinc oxide, zinc hydroxide, zinc carbonate, zinc bicarbonate, or a zinc salt of a 2 to 18 carbon aliphatic carboxylic acid having an ionization constant in water not higher than that of acetic acid.

DETAILED DESCRIPTION AND PREFERRED EMBODIMENTS

The invention is based upon the discovery that the addition of certain zinc compounds to aqueous vinyl ester polymer emulsions of the kind specified below buffers the emulsions during storage under ambient temperature conditions against any substantial change in the pH or the viscosity of the emulsion. I have found that such zinc compounds are excellent viscosity stabilizers and buffering agents for these emulsions, and their presence therein does not cause development of objectionable color or odor. In contrast, weak bases such as ammonium hydroxide, sodium carbonate and hydrazine are relatively ineffective viscosity stabilizers and their presence results in the development of off-white color and objectionable aldehyde odor in a relatively short time.

The vinyl ester polymer emulsions which can be stabilized by the addition of a zinc compound in accordance with the invention are emulsions of a vinyl ester polymer which is free of carboxyl (—COOH) groups and is: (1) a homopolymer of a vinyl ester of a 2 to 8 carbon monobasic alkanoic acid, e.g., vinyl acetate, vinyl propionate, vinyl butyrate or vinyl 2-ethylhexoate; (2) a copolymer of two or more such vinyl esters; or (3) a copolymer of one or more such vinyl esters with one or more 2 to 20 carbon alpha-olefins and/or one or more esters of acrylic acid, methacrylic acid, maleic acid, fumaric acid or itaconic acid and a 1 to 8 carbon alkanol. Examples of the latter esters are ethyl acrylate, methyl methacrylate, dibutyl maleate, diethyl fumarate, diamyl itaconate, 2-ethylhexyl acrylate and 2-ethylhexyl methacrylate, and the like. Examples of such olefins are ethylene, decene-1, dodecene-1 and octadecene-1. Such coplymers will contain a substantial proportion, e.g., at least 50 weight percent and generally at least 75 weight percent of the vinyl ester moiety. The emulsions will generally contain from 35 to 70%, preferably 40 to 65%, by weight of the vinyl ester polymer. The preferred emulsions are those of polyvinyl acetate.

The zinc compounds that are usable as stabilizers of such emulsions in accordance with the invention are zinc oxide, zinc hydroxide, zinc carbonate, zinc bicarbonate and the zinc salts of the 2 to 18 carbon aliphatic carboxylic acids which are no stronger than acetic acid, i.e., have ionization constants in water at 25° C. which are not higher than that of acetic acid. Examples of such zinc salts are zinc acetate, zinc sebacate, zinc adipate, zinc laurate and zinc stearate. Mixtures of such zinc compounds can also be used. The preferred zinc compounds are zinc oxide and zinc acetate with zinc oxide being most preferred for cost reasons and its high effectiveness.

The amount of the zinc compound that is added to the vinyl ester polymer emulsion will depend somewhat upon the composition of the emulsion. However, as little as 0.05% of the zinc compound, calculated as its ZnO equivalent and based upon the emulsion weight, will generally result in a significant improvement in the viscosity stability of the emulsions, but amounts ranging from 0.1 to 1% will most generally be used. The preferred amounts are 0.2 to 0.6%. In any case, the amount of the zinc compound added should be sufficient to adjust and maintain the pH of the emulsion to a value within the range pH 5 to 7, preferably 6 to 7. The amounts of the zinc compound indicated above will generally result in pH values within these ranges. Should the original emulsion have a pH outside the range 4 to 7, other pH adjusting agents, e.g., sodium acetate or sodium bicarbonate or acetic acid may be used to effect all or part of the adjustment of the pH to within the range 4 to 7, and the zinc compound is then added in the amount indicated above to buffer or maintain the pH in the range 5 to 7. Amounts of the zinc compound greater than those indicated can be used but result in no added advantage, are unduly costly, and may yield opaque films, when the emulsion is dried, which are undesirable for some uses. Furthermore, in the case of certain plasticized emulsions, the presence of as much as 1% of zinc oxide is less effective in stabilizing the viscosity than 0.2–0.6%. Emulsions containing the preferred amounts of the zinc compound can be stored as long as three months to two years and longer without any significant change in viscosity or pH occurring.

An accelerated test for determining the viscosity and pH stability of vinyl ester polymer emulsions involves storing a test sample of the emulsion at 85° C. and periodically determining its viscosity and pH. It has been found in the case of polyvinyl acetate emulsions that a storage time of one hour at 85° C. is roughly equivalent to 50 hours at 25° C.

The above accelerated test was applied to each of two freshly prepared commercial grades of polyvinyl acetate emulsions prepared using polyvinyl alcohol as the emulsifier or disperser. Each of these emulsions contained approximately 55% by weight of polymer solids. One emulsion (A) had an initial viscosity of about 2925 cps., measured at 25° C. using a Brookfield Synchro-Letric Viscometer, Model LVF, with a No. 3 spindle at 60 r.p.m. The other emulsion (B) had an initial viscosity of about 900 cps. measured the same way. Samples of emulsions A and B to which various amounts of zinc oxide had been added were similarly tested. A similar series of tests was also carried out with emulsion compositions formulated by adding plasticizers to emulsions A and B.

The results of the above accelerated storage stability tests are reported in Table 1 which also shows the amounts of plasticizers and zinc oxide added. All amounts of the plasticizers shown are based on the weights of the original emulsions, i.e., before adding the plasticizer. All amounts of zinc oxide shown are based upon the combined weights of the original emulsion and any plasticizer used. All viscosities are centipoise (cps.) values measured at 25° C. as indicated above.

Stability tests for the compositions indicated in Table 1 were also carried out at 24° C. and the results are reported in Table 2.

TABLE 1. ACCELERATED STABILITY TESTS—POYLVINYL ACETATE EMULSIONS

| | | | | Viscosities (cps.) and pH values after hours at 85° | | | | | | | | | |
|---|---|---|---|---|---|---|---|---|---|---|---|---|---|
| | | Plasticizer added, percent | ZnO added, percent | 0 hours | | 24 hours | | 96 hours | | 144 hours | | 192 hours | |
| Example number | Emulsion | | | Cps. | pH | Cps. | pH | Cps. | pH | Cps. | pH | Cps. | pH |
| 1 | A | 0 | [1] 0 | 2,925 | 4.5 | 3,825 | 4.6 | 9,700 | 4.0 | c p.s. | 3.9 | d s. | 3.8 |
| 2 | A | 0 | 0.05 | 2,925 | 5.2 | 2,925 | 4.9 | 3,900 | 4.6 | 100,000 | 4.5 | d s. | 4.3 |
| 3 | A | 0 | 0.2 | 2,925 | 6.4 | 2,925 | 6.2 | 2,925 | 5.8 | 2,925 | 5.2 | 4,500 | 5.0 |
| 4 | A | 0 | 0.4 | 2,925 | 6.5 | 2,925 | 6.5 | 2,925 | 6.4 | 2,925 | 6.1 | 3,400 | 5.5 |
| 5 | A | 0 | 0.6 | 2,925 | 6.6 | 2,925 | 6.5 | 29,25 | 6.3 | 2,925 | 6.2 | 2,950 | 6.2 |
| 6 | B | 0 | [1] 0 | 900 | 4.6 | 1,200 | 4.5 | d s. | 4.3 | d s. | 4.0 | d s. | 3.7 |
| 7 | B | 0 | 0.05 | 900 | 4.9 | 950 | 4.6 | 6,760 | 4.4 | d p.s. | 4.2 | d s. | 4.0 |
| 8 | B | 0 | 0.2 | 900 | 5.5 | 900 | 5.2 | 1,200 | 5.0 | 100,000 | 4.8 | d s. | 4.6 |
| 9 | B | 0 | 0.4 | 900 | 6.5 | 900 | 6.2 | 900 | 5.8 | 900 | 5.5 | 3,200 | 5.2 |
| 10 | B | 0 | 0.6 | 900 | 6.8 | 900 | 6.5 | 900 | 6.4 | 900 | 6.2 | 1,200 | 6.0 |
| 11 | A | a 20 | [1] 0 | 10,250 | 4.1 | 15,800 | 4.0 | 35,750 | 3.9 | 65,000 | 3.8 | d s. | 3.2 |
| 12 | A | a 20 | 0.2 | 10,250 | 5.5 | 10,250 | 5.0 | 10,500 | 4.8 | 37,000 | 4.3 | d s. | 3.8 |
| 13 | A | a 20 | 0.4 | 10,250 | 6.4 | 10,250 | 6.0 | 10,250 | 5.8 | 13,500 | 5.6 | 100,000 | 5.0 |
| 14 | A | a 20 | 0.6 | 10,250 | 6.6 | 10,250 | 6.5 | 10,250 | 6.5 | 10,250 | 6.0 | 20,000 | 5.5 |
| 15 | B | b 20 | [1] 0 | 7,400 | 4.4 | 14,500 | 4.2 | 22,500 | 4.1 | 100,000 | 3.8 | d s. | 3.6 |
| 16 | B | b 20 | 0.2 | 7,400 | 6.0 | 7,400 | 5.8 | 8,000 | 5.3 | 13,000 | 5.1 | 25,000 | 4.8 |
| 17 | B | b 20 | 0.4 | 7,400 | 6.4 | 7,400 | 6.3 | 7,400 | 6.2 | 8,400 | 6.0 | 13,800 | 5.6 |
| 18 | B | b 20 | 0.6 | 7,400 | 6.6 | 7,400 | 6.5 | 7,400 | 6.4 | 7,400 | 6.3 | 8,000 | 6.2 |

[1] Control.
a Resoflex 296.—A commercial adipic acid—diethylene glycol ester plasticizer.
b Benzoflex 9-88.—A commercial dipropylene glycol dibenzoate plasticizer.
c p.s.—Partially solid.
d s.—Completely solid.

TABLE 2.—STABILITY TESTS AT 24° C.—POLYVINYL ACETATE EMULSIONS

| | | | | Viscosities (cps.) and pH values after days at 24° C. | | | | | | | |
|---|---|---|---|---|---|---|---|---|---|---|---|
| | | Plasticizer added, percent | ZnO added, percent | 0 day | | 30 days | | 60 days | | 90 days | |
| Example number | Emulsion | | | Cps. | pH | Cps. | pH | Cps. | pH | Cps. | pH |
| 19 | A | 0 | [1] 0 | 2,925 | 4.5 | 3,400 | 4.4 | 4,000 | 4.3 | 6,000 | 4.2 |
| 20 | A | 0 | 0.05 | 2,925 | 5.2 | 2,925 | 5.0 | 3,500 | 4.8 | 4,000 | 4.6 |
| 21 | A | 0 | 0.20 | 2,925 | 6.5 | 2,925 | 6.3 | 2,925 | 6.2 | 2,925 | 5.9 |
| 22 | A | 0 | 0.40 | 2,925 | 6.6 | 2,925 | 6.6 | 2,925 | 6.5 | 2,925 | 6.4 |
| 23 | B | 0 | 0.60 | 2,925 | 6.6 | 2,925 | 6.6 | 2,925 | 6.6 | 2,925 | 6.5 |
| 24 | B | 0 | [1] 0 | 900 | 4.6 | 900 | 4.5 | 1,200 | 4.3 | 1,400 | 4.2 |
| 25 | B | 0 | 0.05 | 900 | 5.2 | 900 | 5.0 | 1,000 | 4.8 | 1,100 | 4.6 |
| 26 | B | 0 | 0.20 | 900 | 5.5 | 900 | 5.5 | 900 | 5.4 | 900 | 5.3 |
| 27 | B | 0 | 0.40 | 900 | 6.0 | 900 | 6.0 | 900 | 5.9 | 900 | 5.9 |
| 28 | B | 0 | 0.60 | 900 | 6.6 | 900 | 6.5 | 900 | 6.5 | 900 | 6.4 |
| 29 | A | [a]20 | [1] 0 | 10,250 | 4.3 | 15,800 | 4.1 | 22,800 | 3.9 | 65,000 | 3.6 |
| 30 | A | [a]20 | 0.2 | 10,250 | 5.7 | 10,250 | 5.5 | 10,250 | 5.3 | 12,800 | 4.8 |
| 31 | A | [a]20 | 0.4 | 10,250 | 6.4 | 10,250 | 6.3 | 10,250 | 6.1 | 10,250 | 5.8 |
| 32 | A | [a]20 | 0.6 | 10,250 | 6.6 | 10,250 | 6.5 | 10,250 | 6.4 | 10,250 | 6.0 |
| 33 | B | [b]20 | [1] 0 | 7,400 | 4.4 | 9,000 | 4.4 | 11,200 | 4.2 | 20,000 | 3.8 |
| 34 | B | [b]20 | 0.2 | 7,400 | 6.0 | 7,400 | 5.8 | 7,600 | 5.3 | 8,000 | 5.1 |
| 35 | B | [b]20 | 0.4 | 7,400 | 6.4 | 7,000 | 6.3 | 7,400 | 6.2 | 7,400 | 5.9 |
| 36 | B | [b]20 | 0.6 | 7,400 | 6.6 | 7,400 | 6.5 | 7,400 | 6.3 | 7,400 | 6.1 |

[1] Control.
[a] Resoflex 296.—A commercial adipic acid—diethylene glycol ester plasticizer.
[b] Benzoflex 9–88.—A commercial dipropylene glycol dibenzoate plasticizer.

It can be seen from Tables 1 and 2 that as little as 0.5% zinc oxide improves significantly the stability with respect to both viscosity and pH. It is further evident from the tables that at least about 0.2% zinc oxide is usually required in order to avoid any significant change in either viscosity or pH during three months storage at 24° C. The accelerated stability data of Table 1 indicate that with about 0.2 to 0.6% zinc oxide, the emulsions will usually remain stable at room temperature for periods up to about 300 days, figuring each hour at 85° C. as equivalent to 50 hours at 25° C.

The above accelerated test was also applied to samples of a freshly prepared commercial vinyl acetate/dibutyl maleate copolymer emulsion prepared using a combination of hydroxyethylcellulose, a sodium alkylarylsulfonate and an ethoxylnonylphenol as emulsifiers and dispersants. The copolymer, containing the equivalent of 85% vinyl acetate and 15% dibutyl maleate, constituted about 56.5% of the total weight of the emulsion, which emulsion also contained butyl Carbitol (monobutyl ether of diethylene glycol) in an amount equal to about 0.4% of the emulsion weight. As subjected to the accelerated test, one sample of the emulsion contained no added zinc oxide, another sample contained 0.2% added zinc oxide, and a third sample contained 0.6% added zinc oxide, based upon the weight of the emulsion. The results of the tests are reported in Table 3.

TABLE 3.—ACCELERATED STABILITY TESTS—VINYL ACETATE/DIBUTYL MALEATE COPOLYMER EMULSIONS

| | | Viscosities (cps.) and pH values at 85° C. after— | | | | | |
|---|---|---|---|---|---|---|---|
| Ex. No. | ZnO added, percent | 0 hour | | 24 hours | | 96 hours | |
| | | cps. | pH | cps. | pH | cps. | pH |
| 37 | 0 | 1,400 | 4.3 | 2,000 | 4.0 | (a) | 3.5 |
| 38 | 0.2 | 1,400 | 6.2 | 1,400 | 6.1 | 1,400 | 6.0 |
| 39 | 0.6 | 1,400 | 6.5 | 1,400 | 6.5 | 1,400 | 6.4 |

[a] Partially solid.

With reference to the emulsions of Examples 22, 23, 27 and 28 of Table 2, those emulsions remained stable with essentially no change in viscosity or pH during 2 years' storage at 24° C., whereas corresponding samples of the control emulsions (Examples 19 and 24) in the same time showed 2 to 4 fold increases in viscosity and decreases in pH to about 3.9 to 4.0.

With reference to Example 32 of Table 2, which example employed 0.6% zinc oxide in a polyvinyl acetate emulsion containing 20% of the Resoflex 296 plasticizer, that example was repeated using the same plasticized emulsion except that 1% (instead of 0.6%) zinc oxide was added thereto. After storage for 60 days at 24° C., the viscosity of the emulsion had increased to 15,000 cps., as compared to a viscosity of only 10,250 cps. for Example 32. These results show that with emulsions containing the Resoflex 296 plasticizer, increasing the zinc oxide content from 0.6 to 1.0% decreased the stabilizing effectiveness of the zince oxide.

The above accelerated test was also applied to the same type of emulsion as was used in Example 24 of Table 2, using zinc oxide and other zinc compounds as stabilizing agents. The results of the tests are reported in Table 4.

TABLE 4.—COMPARISON OF ZINC OXIDE, ZINC ACETATE AND ZINC CARBONATE AS STABILIZERS

| | | Viscosities (cps.) and pH values at 85° C. after— | | | | | |
|---|---|---|---|---|---|---|---|
| Ex. No. | Zn compound added, percent | 0 hour | | 96 hours | | 144 hours | |
| | | cps. | pH | Cps. | pH | Cps. | pH |
| 40 | 0.4, ZnO | 900 | 6.5 | 900 | 5.8 | 900 | 5.5 |
| 41 | 0.8, ZnO | 900 | 6.8 | 900 | 6.6 | 900 | 6.6 |
| 42 | 0.4, Zn (acet.)$_2$ | 900 | 6.5 | 900 | 5.9 | 900 | 5.6 |
| 43 | 0.8, Zn (acet.)$_2$ | 900 | 6.8 | 900 | 6.7 | 900 | 6.6 |
| 44 | 0.3, ZnCO$_3$ | 900 | 6.0 | 900 | 5.8 | 900 | 5.6 |
| 45 | 0.8, ZnCO$_3$ | 900 | 6.8 | 900 | 6.6 | 900 | 6.6 |

The above accelerated test was applied to samples (Series A) of a freshly prepared commercial vinyl acetate/ethyl methacrylate copolymer emulsion in which the copolymer contained 80% vinyl acetate and 20% ethyl methacrylate by weight. The copolymer content of the emulsion was about 57%. The test was also applied to samples of a similar vinyl ester copolymer emulsion (Series B) except that in this case the copolymer contained 80% vinyl acetate and 20% ethylene. The results of the tests are reported in Table 5.

TABLE 5.—ACCELERATED STABILITY TESTS ON VINYL ACETATE/ETHYL METHACRYLATE OR ETHYLENE COPOLYMER EMULSIONS

| | | Viscosities (cps.) and pH values at 85° C. after— | | | | | |
|---|---|---|---|---|---|---|---|
| Ex. No. | Zn compound added, percent | 0 hour | | 96 hours | | 144 hours | |
| | | cps. | pH | Cps. | pH | Cps. | pH |
| Series A: | | | | | | | |
| 46 | 0 (Control) | 980 | 3.9 | 1,400 | 3.4 | 8,000 | 3.0 |
| 47 | 0.4, ZnO | 980 | 5.2 | 980 | 4.9 | 980 | 4.8 |
| 48 | 0.8, Zn (acet.)$_2$ | 980 | 6.0 | 980 | 5.9 | 980 | 5.8 |
| 49 | 0.6, ZnCO$_3$ | 980 | 6.2 | 980 | 6.0 | 980 | 5.9 |
| Series B: | | | | | | | |
| 50 | 0 (Control) | 1,200 | 4.6 | 1,400 | 4.4 | 8,000 | 4.0 |
| 51 | 0.4, ZnO | 1,200 | 6.0 | 1,200 | 6.0 | 1,200 | 5.9 |
| 52 | 0.8, Zn (acet.)$_2$ | 1,200 | 6.6 | 1,200 | 6.4 | 1,200 | 6.4 |
| 53 | 0.6, ZnCO$_3$ | 1,200 | 6.5 | 1,200 | 6.4 | 1,200 | 6.4 |

In all of the accelerated storage tests at 85° C. reported in Tables 1, 3, 4 and 5, the viscosity and pH values reported were actually measured at 25° C.

I claim:
1. An aqueous polymer emulsion having a pH of 5 to 7 and consisting essentially of (A) 35 to 70 percent by weight of a vinyl ester polymer which is free of carboxyl groups and whose molecular structure consists only of carbon, hydrogen and oxygen atoms, which polymer is selected from the group consisting of (a) a homopolymer of vinyl ester of a 2 to 8 carbon monobasic alkanoic acid, (b) a copolymer of at least two such vinyl esters, and (c) a copolymer containing at least 50 percent by weight of such vinyl ester and comonomer selected from the group consisting of alpha-olefins of 2 to 20 carbons and esters of acid selected from the group consisting of acrylic acid, methacrylic acid, maleic acid, fumaric acid and itaconic acid and alkanol of 1 to 8 carbons, all of which esters are fully esterified; and (B) 0.05 to 1 percent, calculated as ZnO and based upon the emulsion weight, of a zinc compound selected from the group consisting of zinc oxide, zinc hydroxide, zinc carbonate, zinc bicarbonate, and zinc salts of 2 to 18 carbon aliphatic carboxylic acids having ionization constants in water at 25° C. not higher than that of acetic acid.

2. An emulsion according to claim 1 containing 0.2 to 0.6% of the zinc compound.

3. An emulsion according to claim 1 wherein the zinc compound is zinc oxide.

4. An emulsion according to claim 1 wherein the zinc compound is zinc acetate.

5. An emulsion according to claim 3 wherein the vinyl ester polymer is polyvinyl acetate.

6. An emulsion according to claim 4 wherein the vinyl ester polymer is polyvinyl acetate.

7. An emulsion according to claim 1 wherein the vinyl ester polymer is a copolymer of vinyl acetate and dibutyl maleate.

8. An emulsion according to claim 1 wherein the vinyl ester polymer is a copolymer of vinyl acetate and methacrylate.

9. An emulsion according to claim 1 wherein the vinyl ester polymer is a copolymer of vinyl acetate and ethylene.

References Cited

UNITED STATES PATENTS

| | | | |
|---|---|---|---|
| 2,757,106 | 7/1956 | Brown | 260—29.6 EMM X |
| 2,904,526 | 9/1959 | Velzmann | 260—29.6 EMM UX |
| 3,423,352 | 1/1969 | Levine | 260—29.6 EMM |

DONALD J. ARNOLD, Primary Examiner

J. B. LOWE, Assistant Examiner

U.S. Cl. X.R.

260—29.6 T, 29.6 R

UNITED STATES PATENT OFFICE
CERTIFICATE OF CORRECTION

Patent No. 3,629,179  Dated December 21, 1971

Inventor(s) John E. Bristol

It is certified that error appears in the above-identified patent and that said Letters Patent are hereby corrected as shown below:

Claim 8, Line 3, "methacrylate" should read -- ethyl methacrylate --.

Claim 9, Line 2, "acopolymer" should read -- a copolymer --.

Signed and sealed this 2nd day of May 1972.

(SEAL)
Attest:

EDWARD M. FLETCHER, JR.
Attesting Officer

ROBERT GOTTSCHALK
Commissioner of Patents